United States Patent
Kamata et al.

(10) Patent No.: US 9,054,544 B2
(45) Date of Patent: Jun. 9, 2015

(54) POWER FEEDING DEVICE, POWER RECEIVING DEVICE, AND WIRELESS POWER FEED SYSTEM

(75) Inventors: Koichiro Kamata, Kanagawa (JP); Misako Sato, Kanagawa (JP); Shuhei Maeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 766 days.

(21) Appl. No.: 13/311,701

(22) Filed: Dec. 6, 2011

(65) Prior Publication Data

US 2012/0161529 A1  Jun. 28, 2012

(30) Foreign Application Priority Data

Dec. 22, 2010  (JP) ................................. 2010-286139

(51) Int. Cl.
   H01F 27/42   (2006.01)
   H01F 37/00   (2006.01)
   H01F 38/00   (2006.01)
   H02J 5/00    (2006.01)

(52) U.S. Cl.
   CPC ...................................... *H02J 5/005* (2013.01)

(58) Field of Classification Search
   CPC ........... H02J 5/005; H02J 7/025; H02J 17/00; H01F 38/14; B60L 11/182
   USPC ........ 307/104, 149, 64, 43; 455/114.3, 67.11, 455/41.2; 320/108, 109, 137
   See application file for complete search history.

(56) References Cited

U.S. PATENT DOCUMENTS

| 5,124,699 A | 6/1992 | Tervoert et al. |
| 5,428,521 A | 6/1995 | Kigawa et al. |

(Continued)

FOREIGN PATENT DOCUMENTS

| JP | 2002-101578 | 4/2002 |
| JP | 2010-119246 | 5/2010 |

(Continued)

OTHER PUBLICATIONS

Miyamoto, et al., "Wireless Power Transfer System with a Simple Receiver Coil", 2011 IEEE MTT-S International Microwave Workshop Series, May 12, 2011, pp. 131-134.

(Continued)

*Primary Examiner* — Rexford Barnie
*Assistant Examiner* — Jagdeep Dhillon
(74) *Attorney, Agent, or Firm* — Nixon Peabody LLP; Jeffrey L. Costellia

(57) ABSTRACT

A wireless power feed system with high transfer efficiency of electric power is disclosed. The wireless power feed system includes a power feeding device and a power receiving device, wherein the power feeding device includes a first electromagnetic coupling coil that is connected to an AC power source via a directional coupler; a first resonant coil; a switch connected to the opposite ends of the first resonant coil; a control circuit which conducts switching on/off of the switch based on a parameter of an amplitude of a reflective wave detected by the directional coupler; and an analog-digital converter provided between the first electromagnetic coupling coil and the control circuit; and the power receiving device includes a second resonant coil; and a second electromagnetic coupling coil, and wherein the first electromagnetic coupling coil is provided between the first resonant coil and the second resonant.

16 Claims, 6 Drawing Sheets

(56) References Cited

U.S. PATENT DOCUMENTS

| | | | |
|---|---|---|---|
| 5,790,946 | A | 8/1998 | Rotzoll |
| 6,509,217 | B1 | 1/2003 | Reddy |
| 6,737,302 | B2 | 5/2004 | Arao |
| 6,837,438 | B1 | 1/2005 | Takasugi et al. |
| 7,180,421 | B2 | 2/2007 | Pahlaven et al. |
| 7,209,771 | B2 | 4/2007 | Twitchell, Jr. |
| 7,301,830 | B2 | 11/2007 | Takahashi et al. |
| 7,394,382 | B2 | 7/2008 | Nitzan et al. |
| 2002/0049714 | A1 | 4/2002 | Yamazaki et al. |
| 2003/0017804 | A1 | 1/2003 | Heinrich et al. |
| 2003/0104848 | A1 | 6/2003 | Brideglall |
| 2004/0077383 | A1 | 4/2004 | Lappetelainen et al. |
| 2004/0128246 | A1 | 7/2004 | Takayama et al. |
| 2004/0131897 | A1 | 7/2004 | Jenson et al. |
| 2004/0145454 | A1 | 7/2004 | Powell et al. |
| 2005/0020321 | A1 | 1/2005 | Rotzoll |
| 2005/0215119 | A1 | 9/2005 | Kaneko |
| 2005/0254183 | A1 | 11/2005 | Ishida et al. |
| 2006/0009251 | A1 | 1/2006 | Noda et al. |
| 2007/0216348 | A1 | 9/2007 | Shionoiri et al. |
| 2007/0229228 | A1 | 10/2007 | Yamazaki et al. |
| 2007/0229271 | A1 | 10/2007 | Shionoiri et al. |
| 2007/0229279 | A1 | 10/2007 | Yamazaki et al. |
| 2007/0229281 | A1 | 10/2007 | Shionoiri et al. |
| 2007/0278998 | A1 | 12/2007 | Koyama |
| 2007/0285246 | A1 | 12/2007 | Koyama |
| 2010/0052431 | A1* | 3/2010 | Mita ............................. 307/104 |
| 2010/0244577 | A1 | 9/2010 | Shimokawa |
| 2010/0259109 | A1 | 10/2010 | Sato |
| 2010/0289449 | A1 | 11/2010 | Elo |
| 2011/0049995 | A1* | 3/2011 | Hashiguchi ................... 307/104 |
| 2011/0080053 | A1 | 4/2011 | Urano |
| 2011/0095619 | A1 | 4/2011 | Urano |
| 2011/0101791 | A1 | 5/2011 | Urano |
| 2012/0032521 | A1 | 2/2012 | Inoue et al. |

FOREIGN PATENT DOCUMENTS

| | | |
|---|---|---|
| JP | 2010-193598 | 9/2010 |
| JP | 2010-239690 | 10/2010 |
| JP | 2010-252468 | 11/2010 |
| WO | WO 2010-055381 A1 | 5/2010 |

OTHER PUBLICATIONS

Karalis A. et al. "Efficient wireless non-radiative mid-range energy transfer", Annals of Physics, vol. 323, pp. 34-48, Apr. 27, 2007.

Kurs et al., "Wireless Power Transfer via Strongly Coupled Magnetic Resonances", Science, Jul. 6, 2007, pp. 83-86, vol. 317, No. 5834.

* cited by examiner

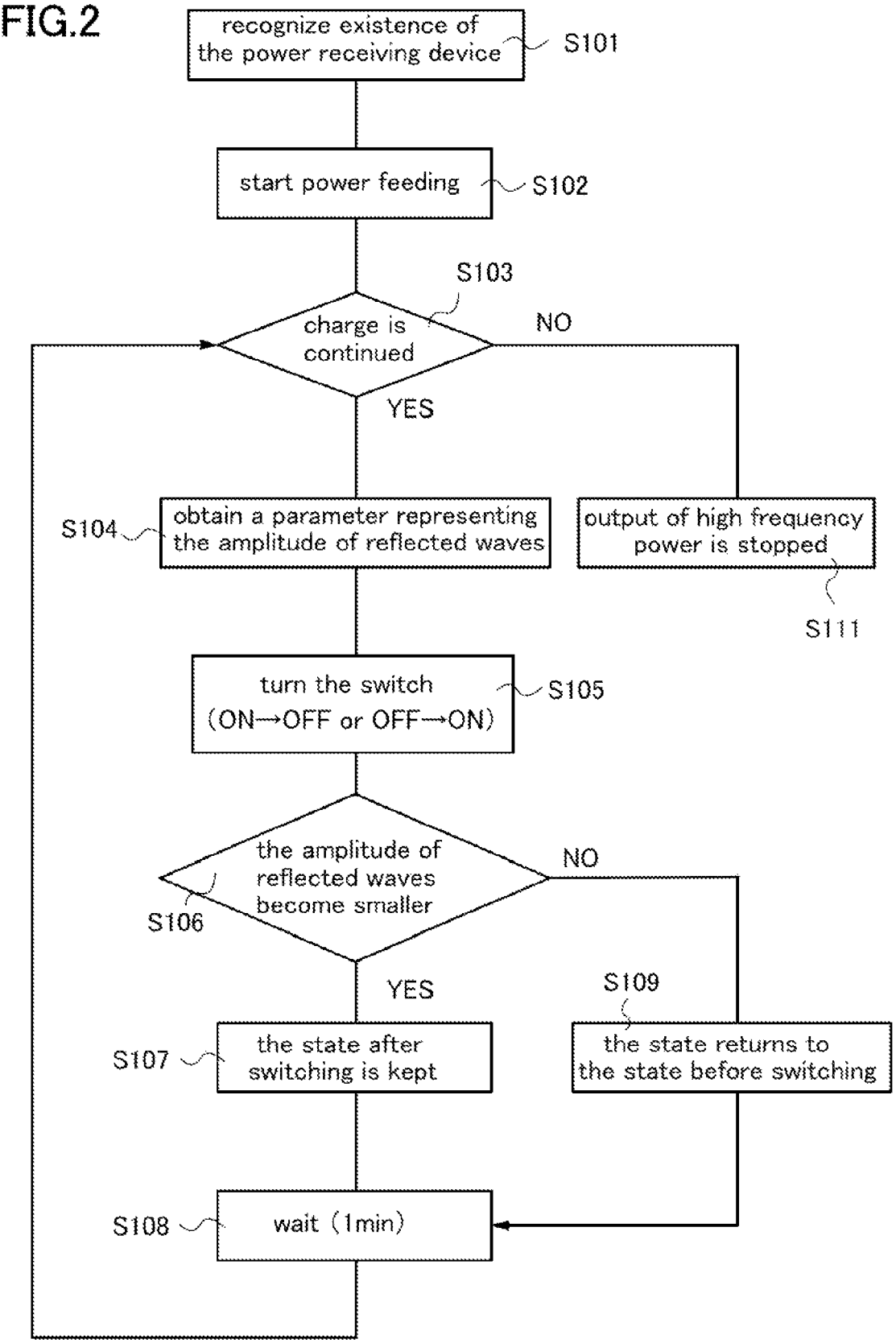

POWER FEEDING DEVICE, POWER RECEIVING DEVICE, AND WIRELESS POWER FEED SYSTEM

BACKGROUND OF THE INVENTION

1. Field of the Invention

One embodiment of the disclosed invention herein relates to power feeding devices, power receiving devices, and wireless power feed systems.

2. Description of the Related Art

Various electronic devices have spread, and a variety of products are in the marketplace. In recent years, mobile electronic devices such as mobile phones and digital video cameras are used very commonly. Further, electric propulsion vehicles; such as electric vehicles, which are supplied with power based on electricity, are showing up in the market.

In such mobile phones, digital video cameras or electric propulsion vehicles, batteries serving as power storage units (referred to as storage batteries) are incorporated. Currently, such a battery is usually charged with use of a household AC power source that is one of power feeding units, and by being, directly contacted with the AC power. In a structure which has no battery or which does not use electricity charged in a battery, a device is operated by power directly fed from a household AC power source via a wire or the like.

On the other hand, researches and developments have been made on a system in which charging on a battery or power feeding on a load is conducted wirelessly, typical examples are an electromagnetic coupling method (also referred to as an electromagnetic induction method, see Reference 1), a radio wave method (also referred to as a microwave method), a resonance method (also referred to as a resonant method, see References 2 to 4).

As described in References 2 to 4, in a wireless power feed technique using a resonance method, a device that receives power (hereinafter, referred to as a power receiving device) and a device that feeds power (hereinafter, referred to as a power feeding device) each have a resonant coil. Further, in each of the power receiving device and the power feeding device, an electromagnetic coupling coil is provided. Feeding power from a power source in the power feeding device to the resonant coil and feeding power from the resonant coil in the power receiving device to a load are conducted by the electromagnetic coupling coils.

The resonant coil of the power feeding device and the resonant coil of the power receiving device are adjusted to resonate (LC resonance) at the same frequency.

When the resonant coil of the power feeding device and the resonant coil of the power receiving device fade each other, they makes a resonant phenomenon, and thereby efficient power transfer is realized even when the distance between the resonant coils are large (see Reference 5).

REFERENCES

[Reference 1] Japanese Published Patent Application No. 2002-1.01578

[Reference 2] Japanese Published Patent Application No. 2010-1.93598

[Reference 3] Japanese Published Patent Application No. 2010-239690

[Reference 4] Japanese Published Patent Application No. 2010-252468

[Reference 5] "Wireless power feeding 2010, all about contactless charging and wireless energy transfer" *Nikkei Electronics*, March 2010, pp. 66-81.

SUMMARY OF THE INVENTION

However, with a wireless power feed system technique using a resonance method, the efficiency of power transfer is lowered when the resonant coil of the power feeding device and the resonant coil of the power receiving device are not in appropriate positions.

In other words, when the resonant coil of the power feeding device and the resonant coil of the power receiving device are too distant from each other, the efficiency of power transfer is lowered. In addition, also when the resonant coil of the power feeding device and the resonant coil of the power receiving device are too close, the efficiency of power transfer is lowered.

FIG. 3A is a perspective view of wireless power feed system using a resonant method and FIG. 3B is a graph showing a relation between a transfer efficiency of electric power and the distance between a resonant coil of a power feeding device and a resonant coil of a power receiving device.

The wireless power feed system using a resonance method illustrated in FIG. 3A includes a power feeding device 1100 and a power receiving device 1110. The power feeding device 1100 includes an AC power source 1101, an electromagnetic coupling coil 1103, and a resonant coil 1104. In addition, the power receiving device 1110 includes a load 1111, an electromagnetic coupling coil 1112, and a resonant coil 1113. In FIG. 3A and FIG. 3B, the distance D between the resonant coil 1104 of the power feeding device 1100 and the resonant coil 1113 of the power receiving device 1110 is regarded as the distance between the power feeding device 1100 and the power receiving device 1110.

Feeding power from the AC power source 1101 of the power feeding device 1100 to the resonant coil 1104 is conducted by an electromagnetic coupling method via the electromagnetic coupling coil 1103. Feeding power from the power feeding device 1100 to the power receiving device 1110 is conducted by electromagnetic resonance of the resonant coil 1104 and the resonant coil 1113. Further, feeding power from the resonant coil 1113 to the load 1111 is conducted by an electromagnetic coupling method via the electromagnetic coupling coil 1112.

As shown in FIG. 3B, in the wireless power feed system using a resonance method, when the distance between the resonant coil 1104 of the power feeding device 1100 and the resonant coil 1113 of the power receiving device 1110 is an optimum distance D1, the power transfer efficiency reaches the maximum value. In other words, the power transfer efficiency in the wireless power feed system using a resonance method is lowered when the distance between the resonant coil 1104 of the power feeding device 1100 and the resonant coil 1113 of the power receiving device 1110 is smaller or larger than the distance D1.

In view of the description made above, it is an object of one embodiment of the disclosed invention to provide a wireless power feed system with high transfer efficiency of electric power.

One embodiment of the disclosed invention provides a wireless power feed system in which when the distance between the power feeding device and the power receiving device is large, power feeding using a resonance method is conducted, and when the distance between the power feeding device and the power receiving device is small, power feeding using an electromagnetic coupling method is conducted.

In the wireless power feed system in accordance with one embodiment of the disclosed invention, in either one of the power feeding device and the power receiving device, the positions of the electromagnetic coupling coil and the resonant coil are interchanged. In other words, an electromagnetic coupling coil of the power feeding device or an electromagnetic coupling coil of the power receiving device is provided between the resonant coil of the power feeding device and the resonant coil of the power receiving device. Specifically, a wireless power feed system is manufactured, in which the resonant coil of the power feeding device, the electromagnetic coupling coil of the power feeding device, the resonant coil of the power receiving device, and the electromagnetic coupling coil of the power receiving device are arranged in this order, or in which the electromagnetic coupling coil of the power feeding device, the resonant coil of the power feeding device, the electromagnetic coupling coil of the power receiving device, and the resonant coil of the power receiving device are arranged in this order.

The positions of the electromagnetic coupling coil and the resonant coil of the power feeding device are interchanged here. In such a wireless power feed system, the resonant coil of the power feeding device, the electromagnetic coupling coil of the power feeding device, the resonant coil of the power receiving device, and the electromagnetic coupling coil of the power receiving device are arranged in this order.

In accordance with one embodiment of the disclosed invention, in the resonant coil of the power feeding device, a switch is provided at opposite ends of the resonant coil. When the distance between the power feeding device and the power receiving device is large or reaches the optimum, the switch of the resonant coil of the power feeding device is turned off. In this manner, by the resonant coils of the power feeding device and the power receiving device, power feeding using a resonance method can be conducted.

In power feeding using a resonance method, when the distance between the resonant coils of the power feeding device and the power receiving device reaches the optimum distance as described above, the power transfer efficiency reaches the maximum value. However, when the resonant coils are closer to each other than the optimum distance, the power transfer efficiency is lowered.

When the distance between the power feeding device and the power receiving device is too small, the switch of the resonant coil of the power feeding device is turned on, which leads to short circuiting of the resonant coil of the power feeding device. Thus, the resonant coil of the power feeding device can be regarded as an element that does not exist electrically.

When the resonant coil of the power feeding device is short circuited, electromagnetic resonance does not occur between the resonant coil of the power feeding device and the resonant coil of the power receiving device. By the interchange of the positions of the resonant coil and the electromagnetic coupling coil of the power feeding device as described above, the electromagnetic coupling coil of the power feeding device and the resonant coil of the power receiving device are adjacent. Between the electromagnetic coupling coil of the power feeding device and the resonant coil of the power receiving device that are adjacent to each other, power feeding using an electromagnetic coupling method is conducted. Thus, even when the distance between the power feeding device and the power receiving device is small, power feeding can be conducted while high power transfer efficiency is kept.

In addition, in a wireless power feed system in which the electromagnetic coupling coil of the power feeding device, the resonant coil of the power feeding device, the electromagnetic coupling coil of the power receiving device, and the resonant coil of the power receiving device are arranged in this order, a switch is provided at the opposite ends of the resonant coil of the power receiving device. When the distance between the power feeding device and the power receiving device is large or reaches the optimum distance, the switch of the resonant coil of the power receiving device is turned off, and power feeding using a resonance method is conducted. On the other hand, when the distance between the power feeding device and the power receiving device is small, the switch of the resonant coil of the power receiving device is turned off, and power feeding using an electromagnetic coupling method is conducted. In this manner, power feeding with the power transfer efficiency kept high can be conducted.

In the above-described manner, even when the distance between the power feeding device and the power receiving device is changed, a wireless power feed system with high power transfer efficiency can be provided.

One embodiment of the disclosed invention relates to a power feeding device including: an electromagnetic coupling coil that is connected to an AC power source via a directional coupler: a resonant coil that is electromagnetically coupled with the electromagnetic coupling coil; a switch one terminal of which is electrically connected to one terminal of the resonant coil and the other terminal of which is electrically connected to the other terminal of the resonant coil; a control circuit to which a parameter of an amplitude of a reflective wave detected by the directional coupler is input and which conducts switching on/off of the switch based on the parameter; and an analog-digital converter provided between the electromagnetic coupling coil and the control circuit.

Another embodiment of the disclosed invention relates to a power receiving device including: a resonant coil; a switch one terminal of which is electrically connected to one terminal of the resonant coil and the other terminal of which is electrically connected to the other terminal of the resonant coil; an electromagnetic coupling coil that is electromagnetically coupled with the resonant coil; a rectifier that is electrically connected to the electromagnetic coupling coil; a load opposite ends of which a DC voltage is applied to by transfer of power rectified by the rectifier; an analog-digital converter that detects the DC voltage and a direct current generated by the DC voltage applied to the load; and a control circuit to which parameters of magnitudes of the DC voltage and the direct current detected by the analog-digital converter are input and which conducts switching on/off of the switch based on the parameters.

In either embodiment of the disclosed invention, the resonant coil is connected to a capacitor.

In either embodiment of the disclosed invention, the capacitor is a stray capacitance.

Another embodiment of the disclosed invention relates to a wireless power feed system including a power feeding device and a power receiving device. The power feeding device includes a first electromagnetic coupling coil that is connected to an AC power source via a directional coupler; a first resonant coil that is electromagnetically coupled with the first electromagnetic coupling coil; a switch one terminal of which is electrically connected to the first resonant coil and the other terminal of which is electrically connected to the other terminal of the first resonant coil; a control circuit to which a parameter of an amplitude of a reflective wave detected by the directional coupler is input and which conducts switching on/off of the switch based on the parameter; and an analog-digital converter provided between the first electromagnetic coupling coil and the control circuit; and the power receiving device includes a second resonant coil that electromagnetically resonates with the first resonant coil; and a second electromagnetic coupling coil that is electromagnetically coupled with the second resonant coil, wherein the first electromagnetic coupling coil is provided between the first resonant coil and the second resonant coil.

Another embodiment of the disclosed invention relates to a wireless power feed system includes a power feeding device; and a power receiving device. The power feeding device includes a first electromagnetic coupling coil that is connected to an AC power source; and a first resonant coil that is electromagnetically coupled with the first electromagnetic coupling coil; and the power receiving device includes a second resonant coil that electromagnetically resonates with the first resonant coil; a switch one terminal of which is electrically connected to one terminal of the second resonant coil and the other terminal of which is electrically connected to the other terminal of second resonant coil; a second electromagnetic coupling coil that is electromagnetically coupled with the second resonant coil; a rectifier that is electrically connected to the second electromagnetic coupling coil; a load opposite ends of which a DC voltage is applied to by transfer of power rectified by the rectifier; an analog-digital converter that detects the DC voltage and a direct current generated by the DC voltage applied to the load; a control circuit to which parameters of magnitudes of the DC voltage and the direct current detected by the analog-digital converter are input and which conducts switching on/off of the switch based on the parameters, wherein the second electromagnetic coupling coil is provided between the first resonant coil and the second resonant coil.

In either embodiment of the disclosed invention, the first resonant coil and the second resonant coil electromagnetically resonate with each other by turning off the switch, and the second electromagnetic coupling coil and the first resonant coil are electromagnetically coupled by turning on the switch.

In either embodiment of the disclosed invention, each of the first resonant coil and the second resonant coil is connected to a capacitor.

In either embodiment of the disclosed invention, the capacitor is a stray capacitance.

In either embodiment of the disclosed invention, an analog-digital converter is provided between the directional coupler and the control circuit.

In either embodiment of the disclosed invention, a capacitor is connected to each of the first resonant coil and the second resonant coil.

In either embodiment of the disclosed invention, the capacitor is a stray capacitance.

Note that the ordinal numbers such as "first", "second", and "third" in this specification are used for convenience and do not denote the order of steps and the stacking order of layers. In addition, the ordinal numbers in this specification do not denote particular names which specify the present invention.

In accordance with one embodiment of the disclosed invention, a wireless power feed system with high power transfer efficiency can be provided.

BRIEF DESCRIPTION OF THE DRAWINGS

In the accompanying drawings:

FIG. 2 is a flow chart describing processing of a wireless power feed system;

DETAILED DESCRIPTION OF THE INVENTION

Figure 1A:
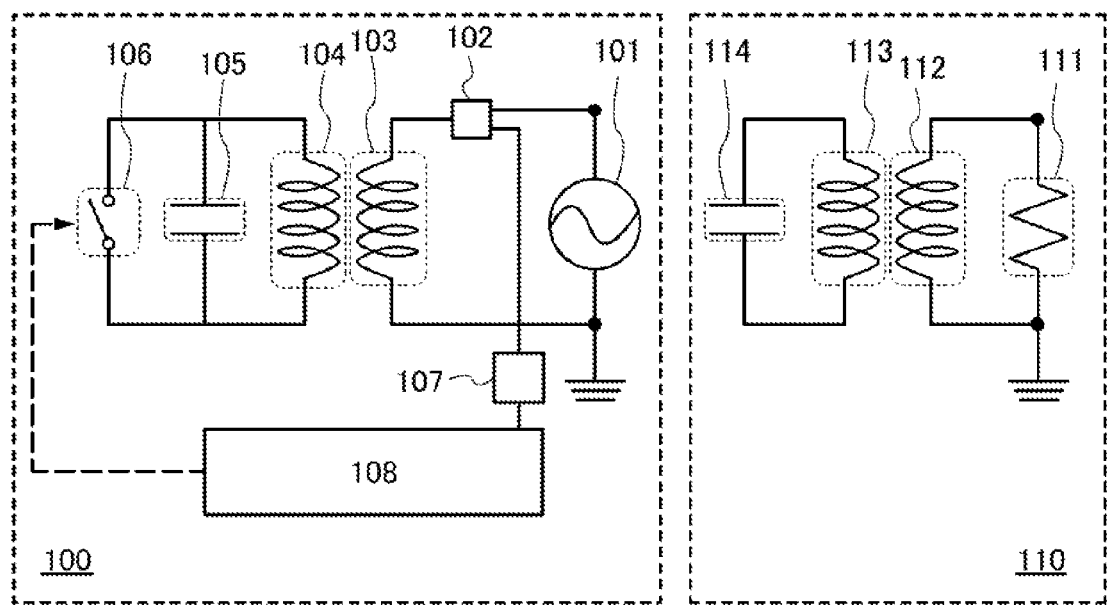
FIGS. 1A and 1B are a circuit diagram and a perspective view of a wireless power feed system.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments. Note that, in the drawings, the same portions or portions having similar functions are denoted by the same reference numerals, and repeated description thereof will not be made.

Embodiment 1

Figure 1B:
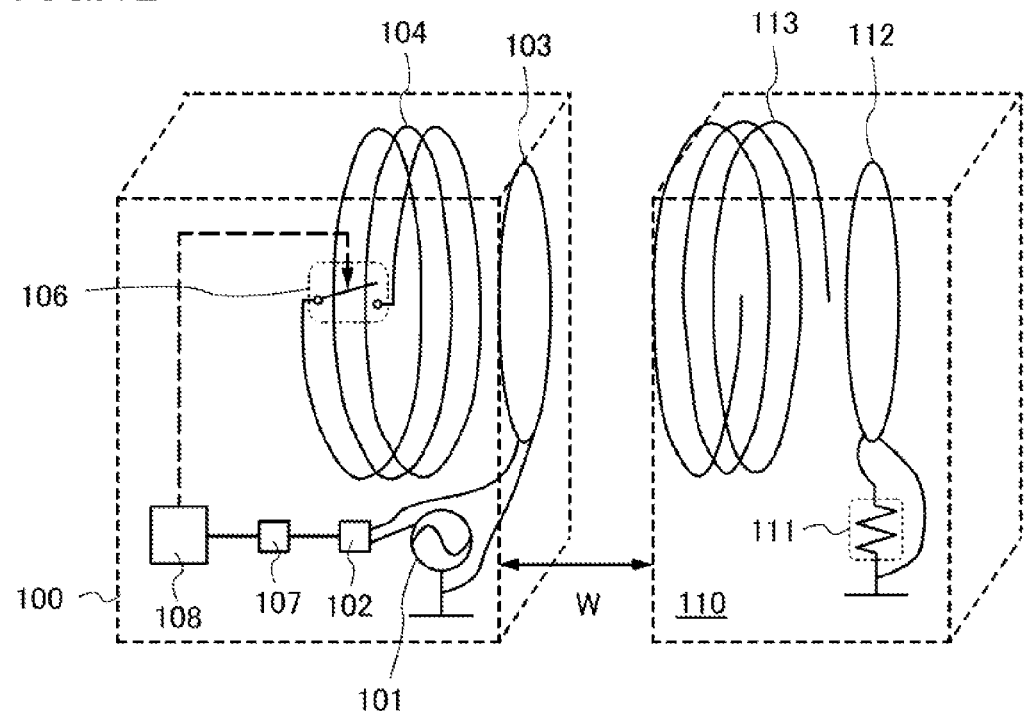

A wireless power feed system in this embodiment is illustrated in FIG. 1A and FIG. 1B. FIG. 1A is a circuit diagram of the wireless power feed system, while FIG. 1B is a perspective view of a part of the wireless power feed system.

The wireless power feed system illustrated in FIG. 1A and FIG. 1B includes a power feeding device 100 and a power receiving device 110. In this embodiment, the distance between the power feeding device 100 and the power receiving device 110 is set as a distance W.

The power feeding device 100 includes an AC power source 101, a directional coupler 102, an electromagnetic coupling coil 103, a resonant coil 104, a capacitor 105, a switch 106, an analog-digital converter (A/D converter) 107, and a control circuit 108. On the other hand, the power receiving device 110 includes a load 111, an electromagnetic coupling coil 112, a resonant coil 113, and a capacitor 114.

The AC power source 101 is a power source that outputs a high frequency power. One terminal of the AC power source 101 is electrically connected to a first terminal of the directional coupler 102. The other terminal of the AC power source 101 is electrically connected to one terminal of the electromagnetic coupling coil 103 and is grounded.

The first terminal of the directional coupler 102 is electrically connected to one terminal of the AC power source 101. A second terminal of the directional coupler 102 is connected to one terminal of the A/D converter 107. A third terminal of the directional coupler 102 is electrically connected to the other terminal of the electromagnetic coupling coil 103.

The directional coupler 102 (also referred to as a coupler) can take out a signal corresponding to power transferred in a forward direction (a traveling wave), or power transferred in the opposite direction (reflective wave), or the both thereof.

Figure 3A:
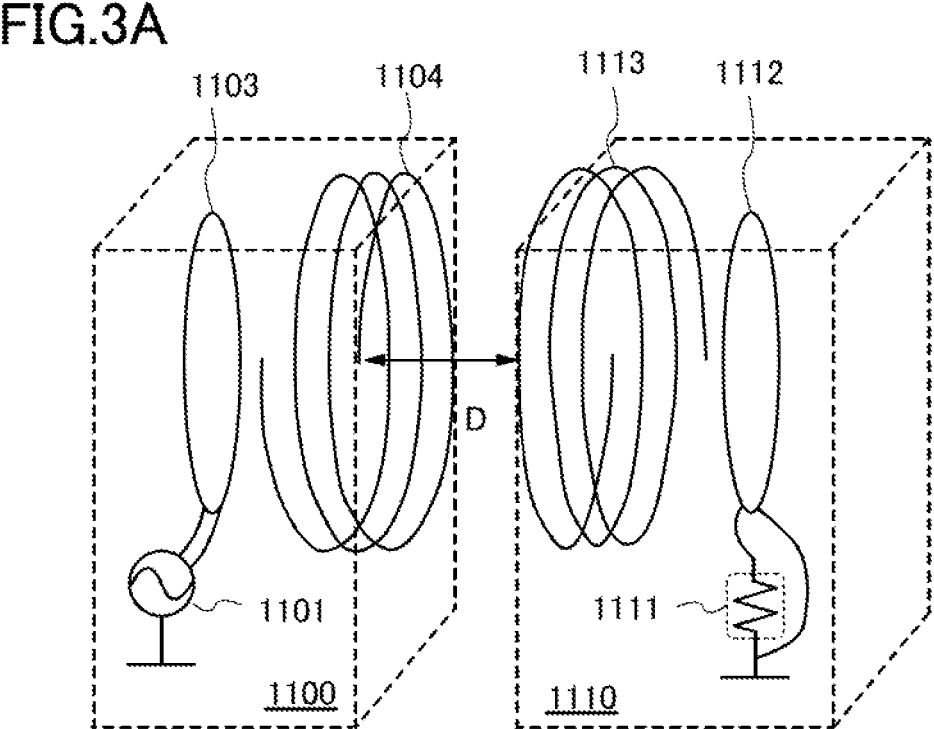
FIG. 3A is a perspective view of a wireless power feed system and FIG. 3B is a graph showing the relation between the distance between resonant coils and a power transfer efficiency.
Figure 3B:
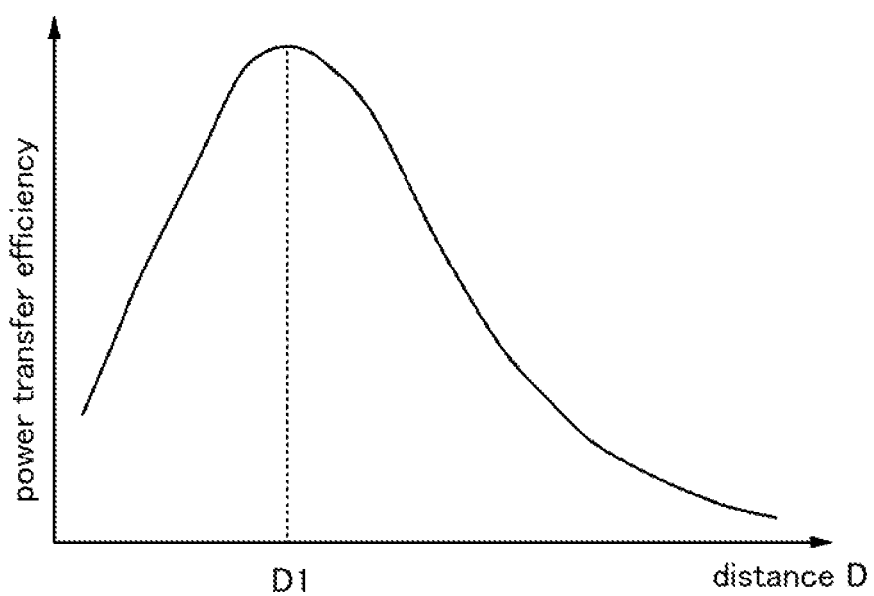

Here, the transfer efficiency of electric power has a close relationship with the reflection coefficient that represents an amplitude of reflection wave (reflected wave amplitude/incident wave amplitude), and the higher the transmission efficiency of a frequency of a power signal is, the smaller the reflection coefficient thereof is compared to a power signal of another frequency, and the reflection coefficient of the power signal of the resonant frequency, with which the transmission efficiency reaches the maximum value, reaches the minimum value compared to the power signals of other frequencies. The directional coupler 102 detects the amplitude of reflected wave, whereby the distance between the power feeding device 100 and the power receiving device 110 (corresponding to the distance D1 in FIG. 3B) can be detected such that the transfer efficiency of electric power reaches the maximum value.

One terminal of the electromagnetic coupling coil 103 is electrically connected to the other terminal of the AC power source 101 and is grounded. The other terminal of the electromagnetic coupling coil 103 is electrically connected to the third terminal of the directional coupler 102.

One terminal of the resonant coil 104 is electrically connected to one terminal of the capacitor 105 and one terminal of the switch 106. The other terminal of resonant coil 104 is electrically connected to the other terminal of the capacitor 105 and the other terminal of the switch 106.

Feeding power from the AC power source 101 to the resonant coil 104 is conducted via the electromagnetic coupling coil 103 by an electromagnetic coupling method.

In the wireless power feed system in this embodiment, between the resonant coil 104 of the power feeding device 100 and the resonant coil 113 of the power receiving device 110, the electromagnetic coupling coil 103 of the power feeding device 100 is provided. Note that in the wireless power feed system in this embodiment, at least one electromagnetic coupling coil should be provided between the resonant coil 104 of the power feeding device 100 and the resonant coil 113 of the power receiving device 110, and thus instead of the electromagnetic coupling coil 103 of the power feeding device 100, the electromagnetic coupling coil 112 of the power receiving device 110 may be provided. Such a structure will be described later with reference to FIG. 6A and FIG. 6B.

The electromagnetic coupling coil 103 of the power feeding device 100 and the electromagnetic coupling coil 112 of the power receiving device 110 are each, for example, a coil of about one turn, while the resonant coil 104 of the power feeding device 100 and the resonant coil 113 of the power receiving device 110 are each, for example, a coil of several turns.

The resonant coil 104 of the power feeding device 100 and the resonant coil 113 of the power receiving device 110 are each open at the opposite ends. The resonant coil 104 and the resonant coil 113 have capacitors due to stray capacitance (corresponding to the capacitor 105 and the capacitor 114 in FIG. 1A and FIG. 1B). Thus, the resonant coil 104 and the resonant coil 113 are LC resonant circuits. Note that the capacitor is not limited to such a stray capacitance method, and the LC resonant circuits may be realized in such a way that the opposite ends of each coil are connected to a capacitor.

In a power transfer technique using coils there is a parameter k×Q (k is a coupling coefficient and Q is a Q value of a resonant coil) as a parameter that represents an index of high power transfer efficiency. The coupling coefficient k is a coupling coefficient that represents a degree of coupling of the resonant coil on the power feeding side and the resonant coil on the power receiving side. Further, the Q value is a value showing sharpness in a resonance peak of a resonant circuit. As the resonant coil 104 and the resonant coil 113, resonant coils having extremely high Q values (for example, the Q is larger than 100 (k×Q is larger than 1)) are preferably used, and thereby a resonant-type wireless power feed technique can realize a high power transfer efficiency.

As illustrated in FIG. 1B, the electromagnetic coupling coil 103 of the power feeding device 100 is positioned near the power receiving device 110. In this manner, when the distance between the power feeding device 100 and the power receiving device 110 is small, the electromagnetic coupling coil 103 of the power feeding device 100 and the resonant coil 113 of the power receiving device 110 can be directly electromagnetically coupled.

In this case, the resonant coil 104 of the power feeding device 100 and the resonant coil 113 of the power receiving device 110 are also closely coupled, and thus the transfer efficiency of electric power is not increased.

Thus, the switch 106 provided for the resonant coil 104 of the power feeding device 100 is turned on. Thereby, the opposite ends of the resonant coil 104 are short circuited so that the function of the resonant coil 104 is lost.

The switch 106 is provided at the opposite ends of the resonant coil 104 of the power feeding device 100, and is turned off when the distance between the power feeding device 100 and the power receiving device 110 is large or reaches the optimum distance, whereas the switch 106 is turned on when the distance is small. Switching on/off of the switch 106 is conducted based on the amplitude of the reflected wave obtained by the directional coupler 102.

One terminal of the A/D converter 107 is electrically connected to a second terminal of the directional coupler 102. The other terminal of the A/D converter 107 is electrically connected to the control circuit 108.

Via the A/D converter 107, data on the amplitude of the reflected wave obtained by the directional coupler 102 is input into the control circuit 108. Based on the input data, the control circuit 108 conducts switching on/off of the switch 106. For example, the control circuit 108 detects the amplitude of the reflected wave at on state or off state of the switch 106 every certain period (for example, every one minute), and selects the state with a smaller amplitude of the reflected wave. Note that in FIG. 1A and FIG. 1B, only the A/D converter 107 is illustrated; however, an amplifier that amplifies the output of the A/D converter 107 or a rectifier that realties the output of the A/D converter 107 may be provided.

In the power receiving device 110, one terminal of the electromagnetic coupling coil 112 is electrically connected to one terminal of the load 111. The other terminal of the electromagnetic coupling coil 112 is electrically connected to the other terminal of the load 111 and is grounded. Note that the load 111 corresponds to another circuit, device, or the like that is connected to the power receiving device 110. As the load 111, for example, a power storage device such as a secondary battery is given.

One terminal of the resonant coil 113 is electrically connected to one terminal of the capacitor 114. The other terminal of the resonant coil 113 is electrically connected to the other terminal of the capacitor 114. As described above, the capacitor 114 may be a stray capacitance formed by open opposite ends of the resonant coil 113 or may be a capacitor connected to the resonant coil 113.

Feeding power from the resonant coil 113 to the load 111 is conducted via the electromagnetic coupling coil 112 by an electromagnetic coupling method.

Hereinafter, an example of a flow chart of a specific procedure of the control circuit 108 is described with reference to FIG. 2.

As an initial state, the switch 106 provided at the opposite ends of the resonant coil 104 of the power feeding device 100 has an off state (an open state).

When the AC power source 101 recognizes existence of the power receiving device 110 with use of a recognition unit (not illustrated) (S101), the AC power source 101 outputs a high frequency power at a frequency f0 and starts power feeding (S102).

Note that the recognition unit is provided for the power feeding device 100 and the power receiving device 110, and is a wireless communication unit or the like for exchanging data of the power feeding device 100 and the power receiving device 110. A carrier frequency and an air interface used for wireless communication of the wireless communication unit are preferably provided separately from an interface (coil) provided for power feeding; however, communication may be conducted using an electromagnetic wave used for power feeding as a carrier via an interface (coil) for power feeding. With the use of the commutation unit, the power feeding device 100 can confirm existence of the power receiving device 110 or obtain a process of charging.

Just after the power feeding starts, the charge is continued (S103). A case where the charge is not continued is a case where power feeding is completed (described later). When the power feeding starts, the directional coupler 102 set in the power feeding device 100 detects the amplitude of the reflected wave and a parameter that represents the amplitude of the detected reflected wave is input into the control circuit 108 via the A/D converter 107. The control circuit 108 memorizes the input parameter (S104).

Next, based on the parameter, switching on/off of the switch 106 is conducted (the switch is turned off when it is on, or the switch is turned on when it is off) (S105).

In a case where the amplitude of the reflected wave is smaller than that before switching (S106), the state after switching is kept (S107). In addition, in a case where the amplitude of the reflected wave is larger (S106), the state returns to the state before switching (S109).

The state after switching is kept during a certain period or is made to return to the state before switching and kept during a certain period (for example, one minute) (S108). After that, charging is continued until power feeding is completed (S103), and this is repeated every certain period (every one minute in the above-described case). When the power feeding is completed, output of high frequency power from the AC power source 101 is stopped (S111).

Figure 4:
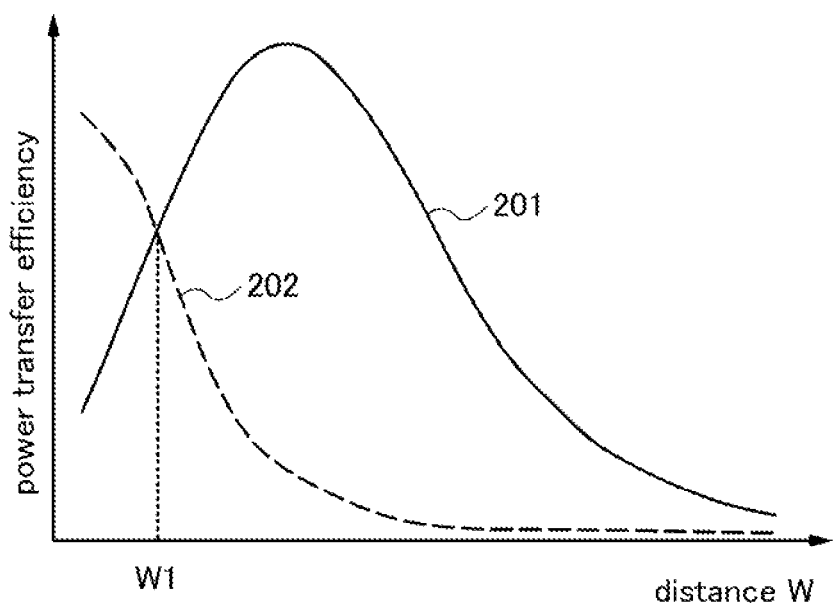
FIG. 4 is a graph showing the relation between a power transfer efficiency and the distance between a power feeding device and a power receiving device.

The relation between the transfer efficiency of electric power and the distance W between the power feeding device 100 and the power receiving device 110 in the wireless power feed system conducting the above-described process is shown in FIG. 4.

In the case where the distance W between the power feeding device 100 and the power receiving device 110 is large or reaches the optimum distance (W is W1 or more), the power transfer efficiency is higher at the off state of the switch (a reflection component is small), and thus the resonant coil 104 is kept at an effective state. The resonant coil 104 at an effective state means power feeding conducted by a resonance method. In FIG. 4, the relation between the distance W and the power transfer efficiency in power feeding using a resonance method is shown by a curve 201.

On the other hand, when the distance W between the power feeding device 100 and the power receiving device 110 is small (W is less than W1), the power transfer efficiency is higher at the on state of the switch, and thus the resonant coil 104 is kept at an ineffective state. The resonant coil 104 at an ineffective state means power feeding conducted by an electromagnetic coupling method. In FIG. 4, the relation between the distance W and the power transfer efficiency in power feeding using an electromagnetic coupling method is shown by a curve 202.

In other words, in the wireless power feed system in this embodiment, in accordance with the distance W between the feeding device 100 and the power receiving device 110, a resonance method and an electromagnetic coupling method are switched, so that the power transfer efficiency can be kept high.

In addition, in the wireless power feed system in this embodiment, switching on/off of the switch 106 is reviewed and if necessary, conducted every certain period (for example, every one minute). Therefore, at the time of charging, every time the position of the power receiving device 110 is changed and thus the distance W between the power feeding device 100 and the power receiving device 110 is changed, a state where the power transfer efficiency can reach the optimum value is selected.

FIG. 1A and FIG. 1B illustrate the wireless power feed system where the electromagnetic coupling coil 103 of the power feeding device 100 is provided between the resonant coil 104 of the power feeding device 100 and the resonant coil 113 of the power receiving device 110; however, one embodiment of the disclosed invention is not limited to that. In another embodiment of the disclosed invention, the electromagnetic coupling coil of the power receiving device may be provided between the resonant coil of the power feeding device and the resonant coil of the power receiving device. In such a wireless power feed system, the resonant coil of the power receiving device is provided with a switch.

Figure 6A:
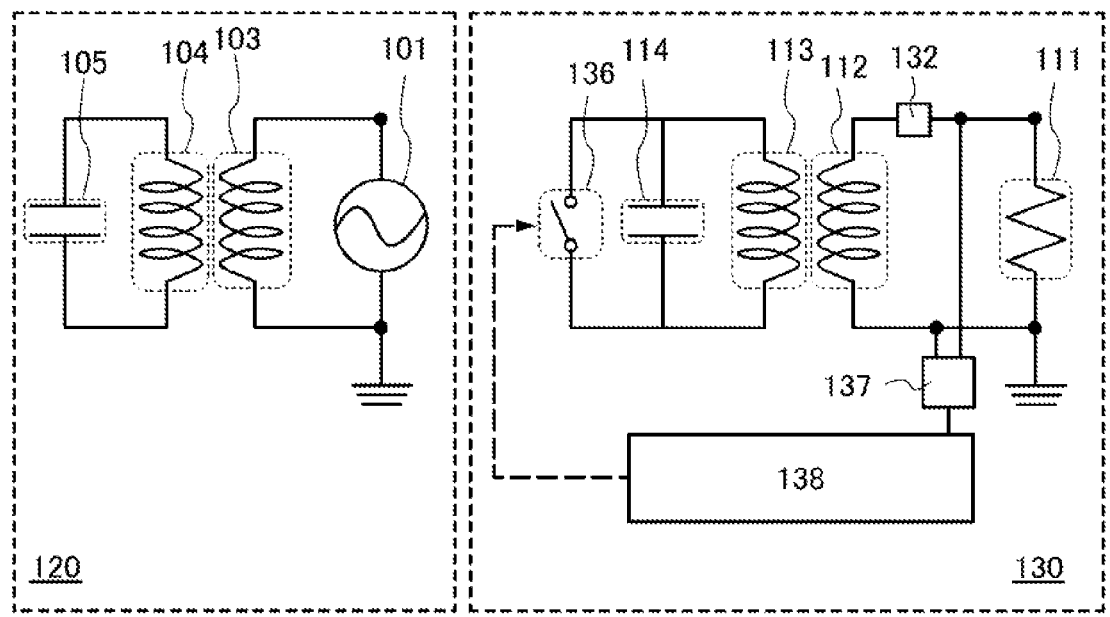
FIGS. 6A and 6B are a circuit diagram and a perspective view of a wireless power feed system.
Figure 6B:
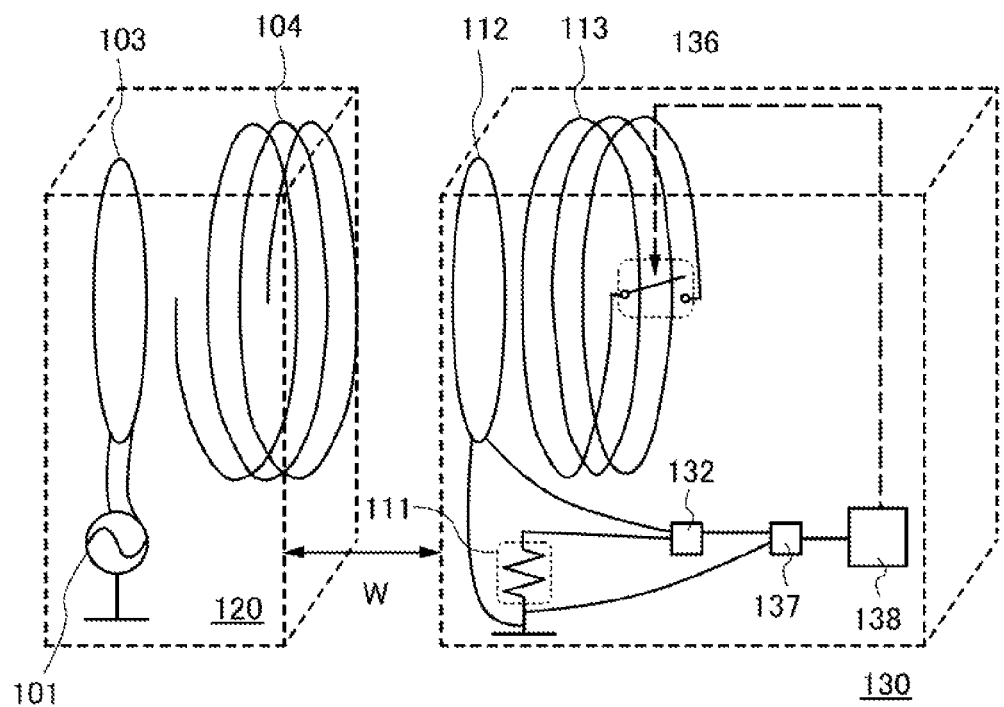

FIG. 6A and FIG. 6B illustrate a wireless power feed system where an electromagnetic coupling coil of a power receiving device is provided between a resonant coil of a power feeding device and a resonant coil of the power receiving device.

The wireless power feed system illustrated in FIG. 6A and FIG. 6B includes a power feeding device 120 and a power receiving device 130. The power feeding device 120 includes the AC power source 101, the electromagnetic coupling coil 103, resonant coil 104, and the capacitor 105.

In addition, the power receiving device 130 includes the load 111, the electromagnetic coupling coil 112, the resonant coil 113, the capacitor 114, a rectifier 132, a switch 136, an A/D converter 137, and a control circuit 138.

One terminal of the electromagnetic coupling coil 103 is electrically connected to one terminal of the AC power source 101. The other terminal of the electromagnetic coupling coil 103 is electrically connected to the other terminal of the AC power source 101 and is grounded.

One terminal of the resonant coil 104 is electrically connected to one terminal of the capacitor 105. The other terminal of the resonant coil 104 is electrically connected to the other terminal of the capacitor 105.

A first terminal of the rectifier 132 is electrically connected to one terminal of the load 111. A second terminal of the rectifier 132 is electrically connected to a first terminal of the A/D converter 137. A third terminal of the rectifier 132 is electrically connected to one terminal of the electromagnetic coupling coil 112. The rectifier 132 is an AC/DC converter and has a function of rectifying received power. Power rectified by the rectifier 132 is transferred to the load 111.

A first terminal of the A/D converter 137 is electrically connected to the second terminal of the rectifier 132. A second terminal of the A/D converter is electrically connected to the other terminal of the electromagnetic coupling coil 112. A third terminal of the A/D converter is electrically connected to the control circuit 138. The A/D converter 137 monitors a DC voltage applied to the opposite ends of the load 111 and a direct current generated by the DC voltage flowing through the load 111. Parameters representing the magnitude of the DC voltage and the magnitude of the direct current, which are monitored by A/D converter 137, are input into the control circuit 138. Based on the parameters, the on/off of the switch provided for the resonant coil 113 is controlled.

One terminal of the electromagnetic coupling coil 112 is electrically connected to the third terminal of the rectifier 132. The other terminal of the electromagnetic coupling coil 112 is electrically connected to the other terminal of the load 111 and is grounded.

One terminal of the resonant coil 113 is electrically connected to one terminal of the capacitor 114 and one terminal of the switch 136. The other terminal of the resonant coil 113 is electrically connected to the other terminal of the capacitor 114 and the other terminal of the switch 136.

As described above, in the wireless power feed system illustrated in FIG. 6A and FIG. 6B, received power is rectified by the rectifier 132. The rectified power is transferred to the load 111, and thereby a DC voltage is applied to the opposite ends of the load 111. A parameter on the DC voltage applied on the opposite ends of the load 111 and a parameter on a direct current flowing through the load 111 are input into the control circuit 138. Based on the input parameter, the control circuit 138 conducts switching on/off of the switch 136.

In accordance with this embodiment described above, a wireless power feed system with high transfer efficiency of electric power can be provided.

Embodiment 2

In this embodiment, applications of the wireless power feed system described in Embodiment 1 can be described. Application examples of a wireless power feed system in accordance with one embodiment of the disclosed invention are mobile telephones, digital video cameras, computers, portable information terminals (such as mobile computers, mobile telephones, portable game consoles, or electronic books), image reproduction devices provided with a recording medium (specifically, a digital versatile disc (DVD)), and the like, which are portable electronic devices. Further, electric propulsion vehicles such as electric vehicles, which get power based on electricity can be given. Below, some examples will be described with reference to drawings.

Figure 5A:
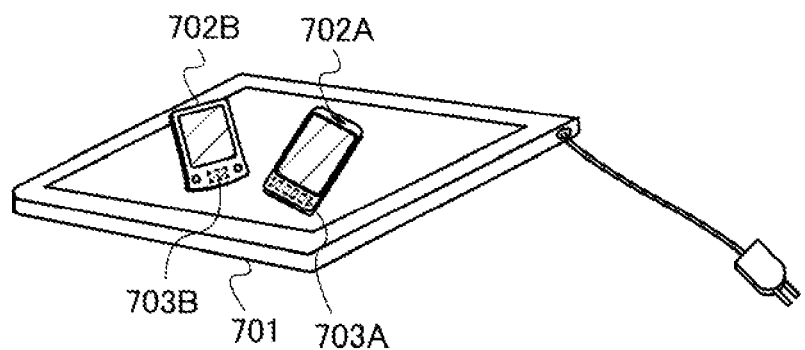
FIGS. 5A and 5B illustrate examples of electronic devices each having a wireless power feed system.

FIG. 5A is an example in which a mobile phone and a portable information terminal use a wireless power feed system, and which includes a power feeding device 701, a mobile phone 702A including a power receiving device 703A, and a portable information terminal 702B including a power receiving device 703B. The wireless power feed system described in Embodiment 1 can be applied between the power feeding device 701 and the power receiving device 703A and between the power feeding device 701 and the power receiving device 703B.

In accordance with this embodiment, a mobile phone and a portable information terminal each having a wireless power feed system with high transfer efficiency of electric power can be provided.

Figure 5B:
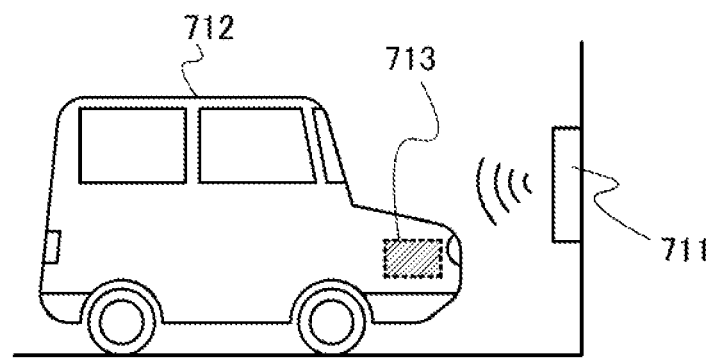

FIG. 5B is an example in which an electric vehicle that is one of electric propulsion vehicles uses a wireless power feed system, and which includes a power feeding device 711 and an electric vehicle 712 including a power receiving device 713. The wireless power feed system described in Embodiment 1 can be applied between the power feeding device 711 and the power receiving device 713.

In accordance with this embodiment, an electric propulsion vehicle having a wireless power feed system with high transfer efficiency of electric power can be provided.

The wireless power feed system described in Embodiment 1 can be provided for any object that can be driven by electric power.

This embodiment can be implemented in appropriate combination with any of the structures described in the other embodiment.

This application is based on Japanese Patent Application serial no. 2010-286139 filed with Japan Patent Office on Dec. 22, 2010, the entire contents of which are hereby incorporated by reference.

What is claimed is:

1. A power feeding device comprising:
   an electromagnetic coupling coil configured to be connected to an AC power source via a directional coupler, wherein the directional coupler is configured to detect an amplitude of a reflective wave;
   a resonant coil, wherein the resonant coil can be electromagnetically coupled with the electromagnetic coupling coil;
   a switch, wherein one terminal of the switch is electrically connected to one terminal of the resonant coil and the other terminal of the switch is electrically connected to the other terminal of the resonant coil;
   a control circuit to which a parameter of the amplitude of a reflective wave detected by the directional coupler is input, wherein the control circuit is configured to conduct switching on/off of the switch based on the parameter; and
   an analog-digital converter provided between the electromagnetic coupling coil and the control circuit,
   wherein the resonant coil is short circuited by turning the switch on,
   wherein the power feeding device is configured to perform power feeding using a resonant method with use of the resonant coil in the case where the switch is turned off, and
   wherein the power feeding device is configured to perform power feeding using an electromagnetic coupling method with use of the electromagnetic coupling coil in the case where the switch is turned on.

2. The power feeding device according to claim 1, wherein the resonant coil is connected to a capacitor.

3. The power feeding device according to claim 2, wherein the capacitor is a stray capacitance.

4. The power feeding device according to claim 1, wherein the switch is turned on/off when the amplitude of the reflective wave becomes larger than the amplitude of the reflective wave before previous switching.

5. A power receiving device comprising:
   a resonant coil;
   a switch, wherein one terminal of the switch is electrically connected to one terminal of the resonant coil and the other terminal of the switch is electrically connected to the other terminal of the resonant coil;
   an electromagnetic coupling coil, wherein the electromagnetic coupling coil can be electromagnetically coupled with the resonant coil;
   a rectifier electrically connected to the electromagnetic coupling coil;
   a load, wherein a DC voltage is applied to opposite ends of the load by transfer of power rectified by the rectifier;
   an analog-digital converter configured to detect the DC voltage and a direct current generated by the DC voltage applied to the load; and a control circuit to which parameters of magnitudes of the DC voltage and the direct current detected by the analog-digital converter are input, wherein the control circuit is configured to conduct switching on/off of the switch based on the parameters, wherein the resonant coil is short circuited by turning the switch on, wherein the power receiving device is configured to receive power using a resonant method with use of the resonant coil in the case where the switch is turned off, and wherein the power receiving device is configured to receive power by an electromagnetic coupling method using the electromagnetic coupling coil in the case where the switch is turned on.

6. The power receiving device according to claim 5, wherein the resonant coil is connected to a capacitor.

7. The power receiving device according to claim 6, wherein the capacitor is a stray capacitance.

8. A wireless power feed system comprising:
a power feeding device; and
a power receiving device;
the power feeding device comprising:
a first electromagnetic coupling coil configured to be connected to an AC power source via a directional coupler, wherein the directional coupler is configured to detect an amplitude of a reflective wave;
a first resonant coil, wherein the first resonant coil can be electromagnetically coupled with the first electromagnetic coupling coil;
a switch, wherein one terminal of the switch is electrically connected to the first resonant coil and the other terminal of the switch is electrically connected to the other terminal of the first resonant coil;
a control circuit to which a parameter of an amplitude of a reflective wave detected by the directional coupler is input, wherein the control circuit is configured to conduct switching on/off of the switch based on the parameter; and
an analog-digital converter provided between the first electromagnetic coupling coil and the control circuit; and the power receiving device including:
a second resonant coil, wherein the second resonant coil is configured to resonate with the first resonant coil electromagnetically; and
a second electromagnetic coupling coil, wherein the second electromagnetic coupling coil can be electromagnetically coupled with the second resonant coil, wherein the first resonant coil is short circuited by turning the switch on, wherein power feeding using a resonant method with use of the first resonant coil and the second resonant coil is performed in the case where the switch is turned off, wherein power feeding using an electromagnetic coupling method with use of the first electromagnetic coupling coil and the second resonant coil is performed in the case where the switch is turned on, and wherein the first electromagnetic coupling coil is provided between the first resonant coil and the second resonant coil during power feeding.

9. The wireless power feed system according to claim 8, wherein the first resonant coil and the second resonant coil electromagnetically resonate with each other during a period in which the switch is turned off, and wherein the first electromagnetic coupling coil and the second resonant coil are electromagnetically coupled during a period in which the switch is turned on.

10. The wireless power feed system according to claim 8, wherein each of the first resonant coil and the second resonant coil is connected to a capacitor.

11. The wireless power feed system according to claim 10, wherein the capacitor is a stray capacitance.

12. The power feeding device according to claim 8, wherein the switch is turned on/off when the amplitude of the reflective wave becomes larger than the amplitude of the reflective wave before previous switching.

13. A wireless power feed system comprising:
a power feeding device; and
a power receiving device;
the power feeding device comprising:
a first electromagnetic coupling coil configured to be connected to an AC power source; and
a first resonant coil, wherein the first resonant coil can be electromagnetically coupled with the first electromagnetic coupling coil;

the power receiving device comprising:
a second resonant coil configured to resonate with the first resonant coil electromagnetically;
a switch, wherein one terminal of the switch is electrically connected to one terminal of the second resonant coil and the other terminal of the switch is electrically connected to the other terminal of the second resonant coil;
a second electromagnetic coupling coil, wherein the second resonant electromagnetic coil can be electromagnetically coupled with the second resonant coil;
a rectifier electrically connected to the second electromagnetic coupling coil;
a load, wherein a DC voltage is applied to opposite ends of the load by transfer of power rectified by the rectifier;
an analog-digital converter configured to detect the DC voltage and a direct current generated by the DC voltage applied to the load;
a control circuit to which parameters of magnitudes of the DC voltage and the direct current detected by the analog-digital converter are input, wherein the control circuit is configured to conduct switching on/off of the switch based on the parameters, wherein the second resonant coil is short circuited by turning the switch on, wherein power feeding using a resonant method with use of the first resonant coil and the second resonant coil is performed in the case where the switch is turned off, wherein power feeding using an electromagnetic coupling method with use of the first resonant coil and the second electromagnetic coupling coil is performed in the case where the switch is turned on, and wherein the second electromagnetic coupling coil is provided between the first resonant coil and the second resonant coil during power feeding.

14. The wireless power feed system according to claim 13, wherein the first resonant coil and the second resonant coil electromagnetically resonate with each other during a period in which the switch is turned off, and wherein the second electromagnetic coupling coil and the first resonant coil are electromagnetically coupled during a period in which the switch is turned on.

15. The wireless power feed system according to claim 13, wherein each of the first resonant coil and the second resonant coil is connected to a capacitor.

16. The wireless power feed system according to claim 15, wherein the capacitor is a stray capacitance.

\* \* \* \* \*